Dec. 26, 1950     C. F. RAISCH     2,535,955
COLLAPSIBLE DRAIN
Filed Nov. 28, 1947     3 Sheets-Sheet 1
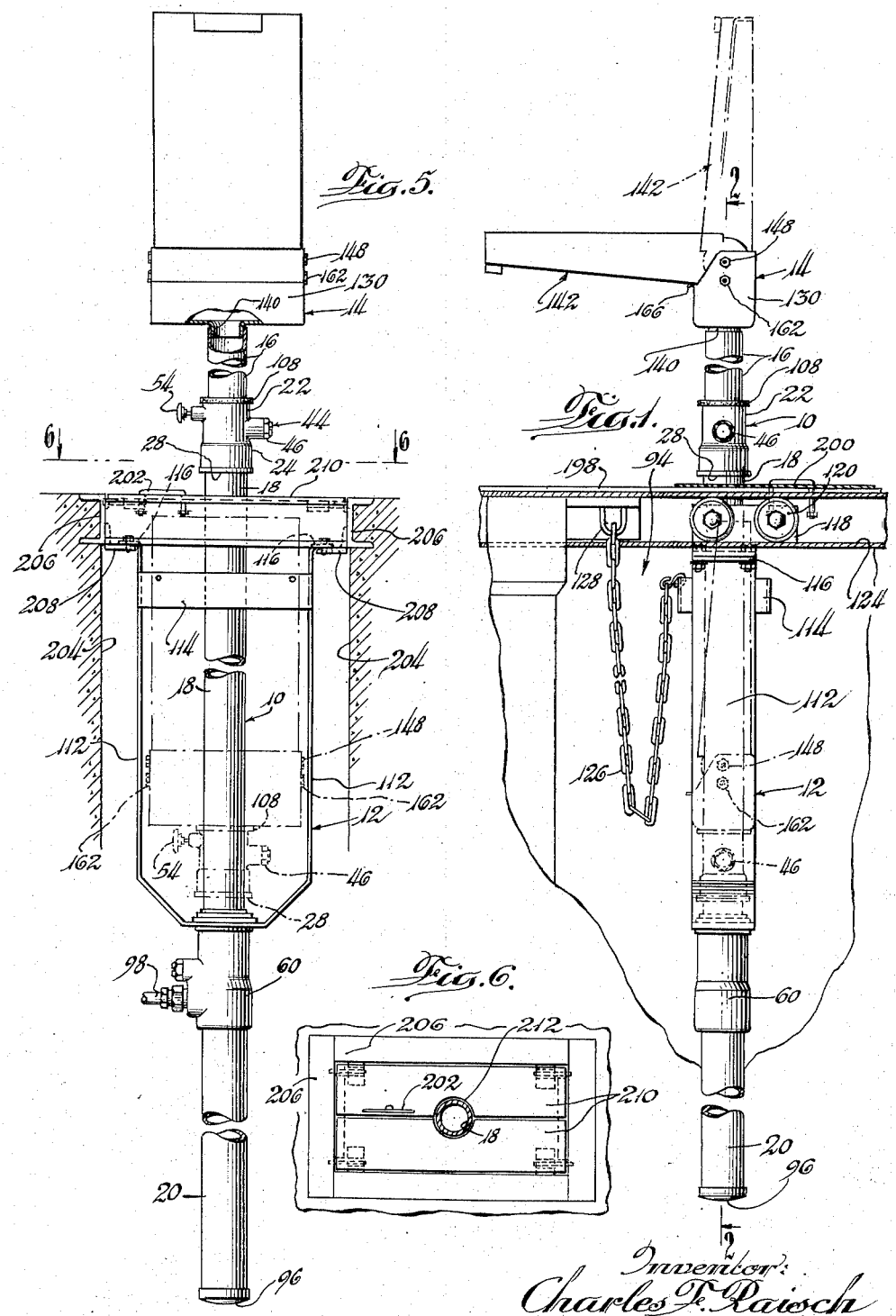
Inventor:
Charles F. Raisch
By Hinkle, Horton, Ahlberg, Hausmann & Wapper
Attorneys.

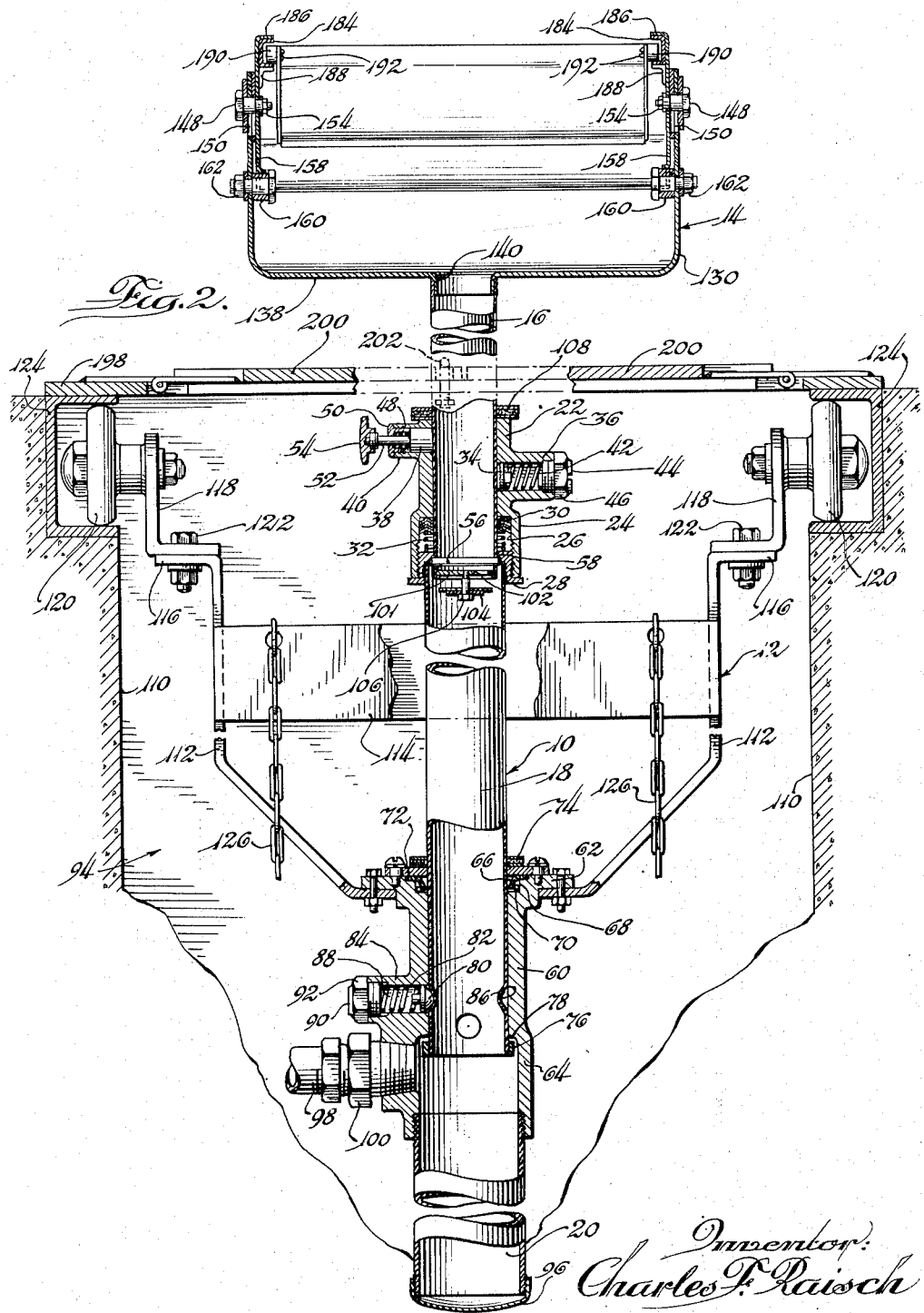

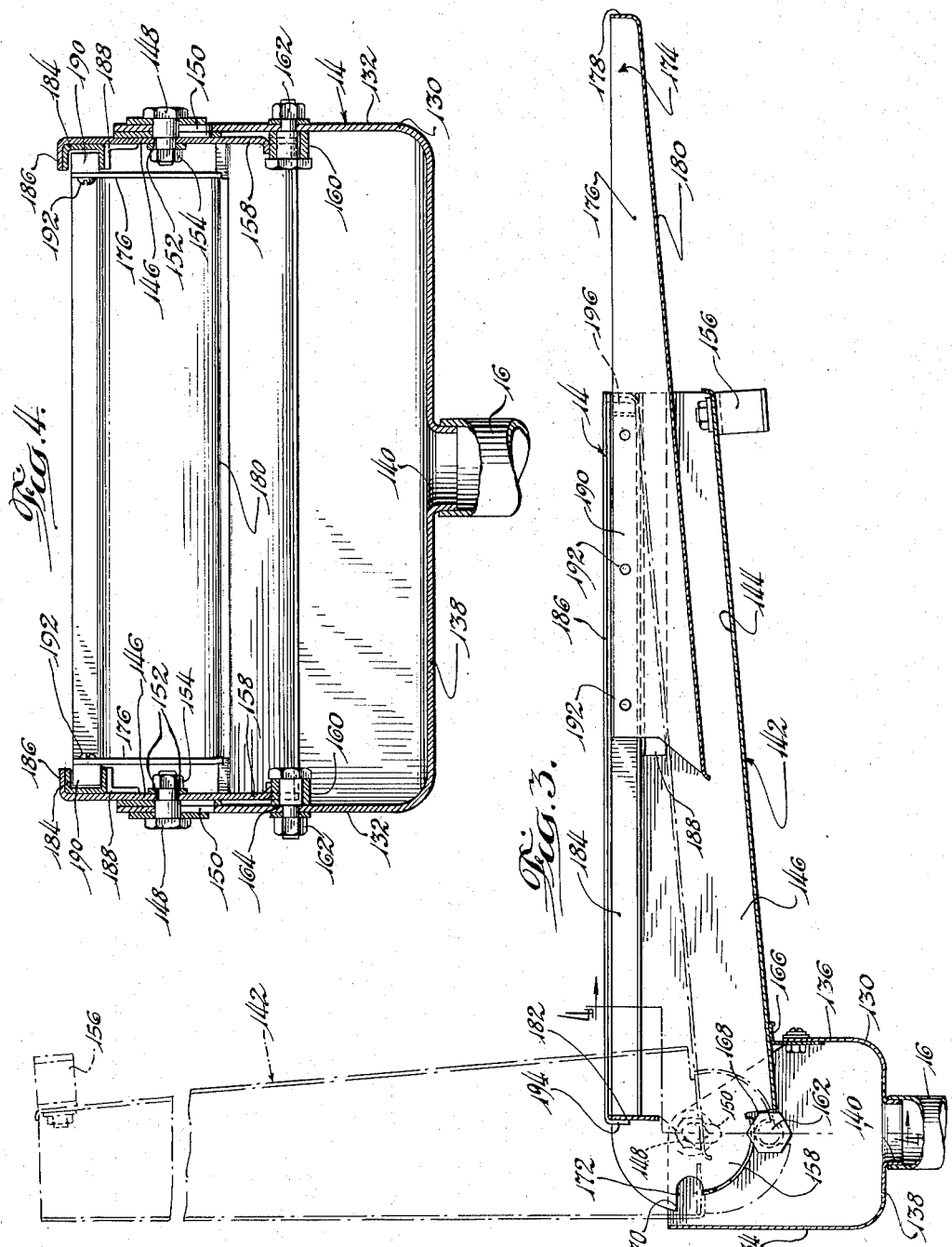

Patented Dec. 26, 1950

2,535,955

UNITED STATES PATENT OFFICE 2,535,955

COLLAPSIBLE DRAIN

Charles F. Raisch, Chicago, Ill., assignor to Stewart-Warner Corporation, Chicago, Ill., a corporation of Virginia Application November 28, 1947, Serial No. 788,417

15 Claims. (Cl. 184—1.5)

The present invention relates to automotive service and repair station equipment and more particularly to a device for facilitating draining of the crank case, differential, or like parts of an automotive vehicle, which is collapsible for compact storage in a pit below the ground or floor level.

Modern automotive vehicle service and repair stations are customarily provided with power operated lifts for elevating the vehicle to a height such that access can readily be had to the underside of the vehicle for performing the required servicing operations such, for example, as draining the lubricant from the crank case or the rear axle and differential housing preparatory to refilling the same with a fresh charge. Heretofore various expedients such as buckets or drums have been used to catch the spent lubricant as it drains from the vehicle, but these are inconvenient to use because they require frequent emptying so that time is consumed in doing this and lubricant may be spilled from the container during the process of emptying the same. In addition, such containers may be filled to overflowing while a vehicle is being drained if constant attention is not given thereto. For these reasons it is difficult to maintain the cleanliness in and about a service or repair station which present day standards require.

Accordingly, a primary object of the invention is the provision of a new and improved draining device for use in automotive service and repair stations or the like for draining lubricant from the crank case or like parts of an automotive vehicle, which is particularly adapted for use in stations equipped with lifts for elevating the automotive vehicle for servicing, and is more convenient to use than present day expedients and which obviates the likelihood of lubricant being spilled on the floor of the station.

Another object of the invention is the provision of a new and improved draining device for use in automotive service and repair stations which may be collapsed for storage in a pit of minimum dimensions below the ground or floor level.

A further object of the invention is the provision of a new and improved draining device which may be elevated into close proximity to the underside of a vehicle when the latter is elevated above ground level and which may be swung in a horizontal arc and is extensible in a horizontal plane to increase the range which may be served by the device so that it is adaptable for use with all makes of automotive vehicles.

A still further object of the invention is the provision of a new and improved draining device for use in automotive vehicle service or repair stations or the like which is simple in construction, inexpensive to manufacture, yet durable and entirely satisfactory in use and which may be readily installed.

These and other objects, advantages and capabilities of the invention will become apparent from the following description wherein reference is had to the accompanying drawings, in which:

Fig. 1 is a side elevational view of the improved draining device of the present invention with the pans disposed in draining position;

Fig. 2 is a vertical sectional view on an enlarged scale taken in the direction of the arrows on the line 2—2 of Fig. 1;

Fig. 3 is a vertical sectional view through the drain pan assembly forming part of the device of the present invention with the intercepting pans shown in phantom in collapsed position;

Fig. 4 is a vertical transverse sectional view taken in the direction of the arrows on the line 4—4 of Fig. 3;

Fig. 5 is a front elevational view of a modified form of the invention with the drain tube assembly in extended position and the drain pan assembly in collapsed position; and Fig. 6 is a top plan view in the direction of the arrows on the line 6—6 of Fig. 5.

Although the device of the present invention can be used in conjunction with drive-on type lifts having runways upon which the vehicle is driven, which are elevated by the lift, it is particularly convenient to use with the type of lift which has two lifting posts, one of which engages under each axle of the vehicle being serviced for lifting the same and the device will, therefore, be described as it might be installed for use with such a lift. In this type of lift, the post which engages the rear axle is ordinarily fixed against longitudinal movement and is housed in a pit below the floor level of the service or repair station, while the post which engages the front axle is housed in a longitudinally extending pit and is adapted to be moved lengthwise of the pit to adapt the lift for use with vehicles of different wheel base. This pit also houses the operating mechanism of the lift and is covered by a suitable deck plate so that no obstructions are present on the floor of the service or repair station.

The form of the invention which will be described first is intended for mounting in the pit of the forward lifting post of a lift of the type above described. Referring to Figs. 1 and 2, wherein the device is shown in its entirety, it will be seen that it comprises a telescoping combined drain and supporting tube assembly indicated by the number 10, a hanger assembly indicated as a whole by the number 12, for supporting the tube assembly from the side walls of the pit in which the lifting post is located, and an extensible drain pan assembly 14 secured to the upper end of the tube assembly.

As best seen in Fig. 2, the drain and supporting tube assembly 10 includes an upper tube 16 which telescopes in an intermediate tube 18 that is adapted to be telescopically received in a base tube 20. The upper tube 16 and intermediate tube 18 are secured for telescopic and pivotal movement by means of a guide and packing sleeve member 22 which slidably receives the upper tube 16 and guides telescopic movement thereof, and which has an enlarged lower end 24 recessed as indicated at 26. This enlarged lower end is internally threaded for receiving a gland nut 28 secured on the upper end of the intermediate tube 18 for thus securing the intermediate tube to the sleeve 22. A plurality of packing washers 30 of V shape in cross-section and of suitable material are housed in the annular recess 26 and are urged into sealing relation by a spring 32 reacting between the washers and the inner end of the gland nut 28.

Telescopic and pivotal movement of the upper tube 16 in the sleeve 22 is restrained by friction means including a friction disc 34 housed in a cylindrical boss 36 formed on the sleeve 22, and a manually releasable friction plug 38 housed in a second cylindrical boss 40 formed on the opposite side of the sleeve from boss 36. The disc 34 is urged into engagement with the wall of upper tube 16 by a spring 42 retained in the cylindrical boss 36 by means of a screw plug 44 threaded into the boss and locked in position by a lock nut 46 so that the tension in the spring can be adjusted. The friction plug 38 is urged into engagement with the wall of tube 16 by a spring 48 secured in the cylindrical boss 40 by means of a nut 50. A stem 52 on the plug projects through the nut 50 and is provided with a knob 54 on its outer end for grasping. The springs 42 and 48 are tensioned to a degree sufficient so that the restraint afforded by disc 34 and plug 38 will hold the tube 16, and any weight which will normally be supported upon it, at any desired elevation.

Upward movement of the upper tube 16 is limited by a pin 56 which extends diametrically through this tube adjacent its lower end and has ends projecting through the walls thereof in a position to engage an internal annular shoulder 58 on the gland nut 28. The pin has rounded ends and it is of a length corresponding to the internal diameter of the intermediate tube so that it guides the lower end of the upper tube 16 when the latter is moved telescopically with respect to the intermediate tube.

The intermediate tube 18 is slidably supported in a sleevelike member 60 which has a peripheral flange 62 on its upper end and an enlarged lower end 64 into which the upper end of the base tube 20 is threaded. A fluidtight connection between the upper end of the sleeve 60 and the intermediate tube is secured by means of a packing washer 66 housed in an annular recess 68 formed in the upper end of sleeve 60 and urged into engagement with the wall of tube 18 by a resilient ring 70. This washer is held in position in the recess 68 by means of a flat metal washer or ring 72 surrounding tube 18 and secured to the upper end of sleeve 60 by screws threaded into flange 62 as indicated in Fig. 2.

Downward movement of the intermediate tube 18 is limited by engagement of the head of gland nut 28 upon a cushioning ring 74 of suitable resilient material seated upon the ring 72, while upward movement of this tube is limited by an external ring 76 on its lower end which is adapted to engage a shoulder 78 formed at the inner end of the enlarged portion 64 of the sleeve 60. The intermediate tube 18 is held in extended position by means of a semispherical plug 80 housed in a cylindrical opening 82 in a lateral boss 84 on the sleeve 60. This plug is urged into engagement with a peripheral groove 86 adjacent the lower end of tube 18 by a spring 88 housed in the boss 84. The spring is tensioned by a screw plug 90 threaded into opening 82 and locked in position by a lock nut 92.

In order to raise the drain pan assembly 14 to the proper height for use, it is normally lifted from a pit 94 in which it is housed when not in use, this pit being the same pit in which the front lifting plunger of the lift is located. Since telescopic movement of the intermediate tube 18 is restrained by the single friction plug 80, while movement of the upper tube 16 is restrained by the plug 38 and friction disc 34, the intermediate tube normally will be raised to its fully extended position before the upper tube moves with respect to sleeve 22. This movement of the intermediate tube will carry the upper sleeve member 22 a considerable distance above the floor level so that the knob 54 will be readily accessible and the friction plug 38 may be released by pulling on the knob, thus reducing the restraint on the upper tube and facilitating telescopic movement of this tube in sleeve member 22 if it is necessary to raise the drain pan assembly further.

As previously mentioned, the upper end of the base tube 20 is threaded into the enlarged lower end of the sleeve 60 and this tube should be of sufficient length to receive the telescoped intermediate and upper tubes to form a housing therefor when the drain is in inoperative position. It also forms a reservoir into which lubricant drains and, therefore, the lower end of this tube is closed by a cap 96 secured thereto by a leakproof union. Lubricant drains from the upper end of this tube through a flexible conduit 98 which is secured at one end to an opening in the lower end of the sleeve 60 by means of a suitable coupler fitting 100. The other end of the conduit 98 may be connected to a reservoir or receptacle of suitable dimensions at a lower level than the end connected to the sleeve 60 so that the lubricant will readily gravitate from the sleeve.

To assist in securing draining of the lubricant from the intermediate tube 18 and base tube 20, the lower end of the upper tube 16 is provided with a one-way check valve which will now be described. This valve includes a disc 101 in the end of tube 16 which has an opening 102 extending therethrough. A check valve 104 for closing opening 102 is slidably supported by a cap screw 106 depending from the disc 101. It will be obvious that when the tube assembly is in the extended position shown in Fig. 2, lubricant draining into the upper tube will flow through opening 102 into the intermediate and base tubes. After the lubricant reaches the level of the outlet opening in which the conduit 98 is secured, it will normally drain off as fast as it collects in the tubes.

The lubricant in the tube 20 below this outlet, or any lubricant which may collect in the intermediate tube 18, if the conduit 98 does not carry it off fast enough, is forced from the tubes upon downward telescoping movement of the upper and intermediate tubes due to the fact that valve 104 closes opening 102 when it contacts the lubricant collected in the tube assembly, and thereafter the upper tube functions as a piston forcing the collected lubricant out of the drain conduit 98 so that the major portion of the lubricant in base tube 20 will be forced therefrom. The clearance between intermediate tube 18 and base tube 20 permits lubricant in this tube to flow upwardly between these tubes to the outlet opening when the telescoping tubes are collapsed into the base tube.

Downward movement of the upper tube is limited by engagement of the pan assembly 14 with a cushioning ring 108 seated upon the upper end of the upper sleeve 22, as shown in Fig. 2. This cushion may be made from felt or any suitable resilient synthetic rubberlike material so that it is not affected by lubricant or age.

The previously mentioned hanger assembly 12, by means of which the tube assembly 10 is supported from the side walls 110 of the pit, is formed from two plates or bars 112 which, when assembled, are of U shape as shown in Figs. 2 and 5. Reinforcing crosspieces 114 are secured on each side of the hanger adjacent its upper end, and the base ends of the plates 112 are secured to the flange 62 on the lower sleeve 60 by bolting the same thereto. The upper ends of the plates 112 are bent outwardly to form flanges 116, as indicated in Fig. 2, for securing the hanger to a support such as the movable carriages shown at 118 in Figs. 1 and 2.

These carriages, which may consist merely of a length of angle iron, have a pair of rollers 120 rotatably secured to the vertical flanges of the angle irons while the flanges 116 on the hanger are bolted to the horizontal flanges on the angle pieces by two or more bolts 122. The rollers 120 are adapted to be received between the flanges of a pair of track forming channels 124 set in the side walls 110 of the pit adjacent its upper edge so that the rollers roll along the upper surface of the lower flange of the two channels 124. These channels may be the same channels from which the lifting plunger is supported, and along which it is longitudinally movable. It will thus be observed that the construction described provides for limited movement of the drain assembly longitudinally of the vehicle being serviced, thus adapting the drain for use with vehicles of different wheel base. If desired, a pair of chains 126 may be provided for limiting the extent of longitudinal movement of the drain, and these chains are preferably secured at one end to one of the crosspieces 114 of the hanger, and at the other end to a structure such as a part of the lift indicated at 128 in Fig. 1.

The previously mentioned drain pan assembly 14 which is carried on the upper end of the upper tube 16 includes a funneling member or pan 130 which may be a sheet metal stamping. As best seen in Figs. 3 and 4, this funneling pan has end walls 132, a front wall 134, and rear wall 136 which merge into a bottom wall 138. This bottom wall has a centrally located aperture 140 defined by a peripheral depending flange which is adapted to be received in the upper end of upper tube 16 and is secured thereto by suitable means such as welding firmly to secure the funneling pan to the tube assembly.

Pivotally supported upon the end walls 132 of the funneling pan is a sheet metal trough-shaped intercepting pan 142 which has a downwardly inclined bottom 144, side walls 146, and an open front and back. The forward ends of the side walls project beyond the forward edge of the bottom wall 144 and are rounded, as indicated in Fig. 3. These projecting forward ends are pivotally secured upon bolts 148 extending through vertical slots 150 in the end wall 132 of the funneling pan so that the intercepting pan assembly may be pivotally moved between the horizontal position shown in full lines in Fig. 3, and the vertical position shown in phantom.

To prevent binding between the intercepting pan 142 and the funneling pan 130, the bolts 148 are each provided with a shoulder 152 which engages the side walls of the intercepting pan as seen in Fig. 4, and spaces the heads of these bolts therefrom sufficiently to allow for free pivotal movement of the intercepting pan assembly. Preferably washers secured on the bolts on each side of the funneling pan 132 and the bolts 148 are fixed with respect to the intercepting pan by a nut 154 on each bolt which is tightened until the side walls of this latter pan are tightly gripped between the nuts 154 and shoulders 152.

A handle 156 bolted to the underside of the bottom wall 144 of the intercepting pan 142 adjacent its rear edge is provided for manipulating the same, and the pan is guided for pivotal movement by the lower portion of the forwardly projecting ends of its side walls which form flanged quadrant shaped forward extensions 158. The flanged edges of these extensions ride upon rollers 160 carried upon bolts 162 secured in the end walls of the funneling pan 130 below the bolts 148. The heads of these bolts 162 are maintained in spaced relation to the end walls 132 of the funneling pan, thus to support pivotally the rollers 160 by means of a shoulder 164 on each of the bolts which engage the end walls 132.

When the intercepting pan assembly is in the horizontal position shown in full lines in Fig. 3, the rear ends of the flanges on the quadrant shaped guides 158 engage upon the rollers 160, and the pivot bolts 148 which are fixed with respect to the side walls 146 of the intercepting pan 142 are at the top of the slots 150 in the end walls of the funneling pan 130, while the bottom wall 144 of this intercepting pan rests upon an outturned flange 166 on the back wall 136 of the funneling pan 130. The flange 166 thus forms a fulcrum upon which the intercepting pan tends to pivot in a clockwise direction as seen in Fig. 3 so that the bolts 148 are held against the upper ends of slots 150, thus locking the pan in the substantially horizontal position shown in Fig. 3.

Pivotal movement of the intercepting pan assembly toward upright position is guided by the flanged extension 158 engaged upon rollers 160. When it reaches the upright position shown in phantom in Fig. 3 an extension 170 of its forwardly projecting side walls engages the rollers 160, and at the same time a longitudinally extending slot 172 in each of these forward projections is brought into vertical alignment with the vertical slots 150 in the end walls 132 of the funneling pan 130 so that the intercepting pan drops until the bottom of slots 172 rests upon rollers 160. In this position the intercepting pan is locked against pivotal movement in either direction. It may be released for movement to a horizontal position by raising the same sufficiently to disengage the slots 172 from the rollers 160.

In order to increase the range which may be served by the device, an extension 174 similar in shape to the pan 142 is provided which is longitudinally extensible with respect to the latter pan. This extension, which may be a sheet metal stamping, has side walls 176, a rear wall 178, and a bottom wall 180 which inclines downwardly in a manner similar to the bottom wall of the pan 142 so that lubricant flowing onto this bottom 180 gravitates toward the funneling pan 130. Sliding support for the extension is secured by means of a U-shaped track forming member which has a crosspiece 182 of the same length as the inside width of the pan 142, and a pair of longitudinally extending slides or track forming channels 184. These channels are held in slidable engagement with flanges 186 extending longitudinally of the upper edge of the intercepting pan 142 by a pair of longitudinally extending brackets or angle pieces 188 secured to the inner side of the side walls of the pan 142. An elongated rectangular slide 190 is secured to the outer sides of the side wall 176 of the extension 174 adjacent the forward ends thereof by means of screws 192. These slides are positioned for engagement in the lateral track forming channels 184.

When the two members forming the intercepting pan assembly are in contracted position, the forward ends of the slides 190 are in engagement with the crosspiece 182 and the latter with the integral track forming channels 184 are in their extreme forward position, the limit of which is determined by the engagement of the crosspiece with stops 194 formed by turning down the forward ends of the upper edge flanges 186 of the intercepting pan 142, as indicated in Fig. 3. Upon movement of the extension 174 in a rearward direction, the slides 190 will slide in the track forming channels 184 until the rear ends of the slides engage against suitable stops 196 positioned adjacent the rear ends of these track forming channels, as indicated in Fig. 3. Further movement of the extension in a rearward direction will cause the track forming channels 184 to slide rearwardly, such movement being guided by the brackets 188 and upper edge flanges 186 until the extension reaches the limit of its rearward movement.

It will thus be obvious that with the sliding connection above described, the extension 174 is rigidly supported in aligned relation with the intercepting pan 142 irrespective of the position to which it has been withdrawn so that lubricant will always gravitate from the bottom of the extension to the bottom of the pan 142 and thence to the funneling pan 130.

As previously mentioned, the pit 94, in which the forward plunger of the lift is housed along with the operating mechanism of the lift, is covered with deck plate 198 as indicated in Fig. 2, and there is an opening in this deck plate through which the lift may be projected which preferably is closed by a pair of doors when the lift and drain are in retracted position. A second opening through which the drain may be projected is provided in the deck plate, and this opening is closed by a pair of doors 200, shown in Fig. 2, when the drain is in retracted position. These doors are hinged to the sides of the opening through which the drain may be raised. One or both of the doors is provided with a handle 202 for facilitating opening of the same.

In Fig. 5 is shown a modified form of draining device which differs from the drain just described, mainly in the fact that its hanger is fixedly mounted to the side walls of the pit in which the drain is housed, rather than being longitudinally movable. This form of the invention may be used in conjunction with the form previously described and may be located in a pit 204 adjacent the pit in which the rear plunger of the lift is located, so that it can be used for draining the differential housing of the vehicles being serviced. Channel irons 206 are set in the walls of the pit adjacent the upper ends of these walls to form a fixed support for the drain.

This drain includes an upper tube 16 telescopically secured with respect to an intermediate tube 18 by means of a sleeve-like member 22, and a base tube 20 is secured to the lower end of the intermediate tube by means of a sleeve-like member 60 similar to that previously described. Since the drain is fixed, the base tube may be buried below the pit and it is provided with a drain conduit 98 leading to the reservoir or receptacle for receiving drained lubricant.

A drain pan assembly 14, similar in every respect to that previously described, is secured to the upper end of the upper tube 16, and the tube assembly is supported from a hanger 12 constructed in the manner previously described. However, the flanges 116 on the upper ends of this hanger are fixedly bolted to brackets 208 fixed to the sides of the channels 206.

The pit into which this drain is retracted may be covered with doors 210 of deck plate, as indicated in Fig. 6, and a cylindrical opening 212 conforming to the diameter of the intermediate tube 18 may be formed in the edges of the doors so that they can be closed after the drain pan assembly has been withdrawn from the pit 204.

In addition to being useful with the two-post lifts above described, the last form of drain may also be advantageously used in conjunction with drive-on type lifts, or in service or repair stations which have pits over which vehicles are driven for servicing, rather than lifts.

From the above description of two embodiments of the invention it will be apparent that an improved drain has been provided which may be retracted into a pit below the floor level of a service or repair station so that no obstruction is afforded thereby when it is not in use. To raise the drain for use, it is merely necessary to open doors 200 and apply a lifting force to the handle 156 on the intercepting pan assembly until the pan assembly is at a proper height for use, and if necessary the friction plug 38 may be released as before described to facilitate telescoping movement of the upper tube 16.

The intercepting pan assembly can of course be released for movement to a horizontal plane by the application of a lifting force on the handle 156, and the extension 174 may be withdrawn to the extent necessary to reach the particular part of the vehicle which is to be drained. This pan assembly can of course be pivoted about the axis of the tubes if necessary to bring it under the outlet port which is to be drained, and with the form of the invention first described the entire drain may be moved longitudinally of the pit to accommodate the drain to vehicles of different wheel base length.

To move the drain to retracted position the extension 174 is telescoped into the pan 142 and the latter then raised to upright position from which it is allowed to drop to locked position. Thereupon a downward force may be applied to the collapsed pan assembly until it has been lowered to inoperative position between the sides of the hanger 12, as indicated in phantom in Figs. 1 and 5. During this movement the lubricant which has collected in the tube assembly is forced out in the manner previously described.

While I have shown and described a preferred embodiment of my invention, it will be apparent that numerous variations and modifications thereof may be made without departing from the underlying principles of the invention. I, therefore, desire, by the following claims, to include within the scope of the invention all such variations and modifications by which substantially the results of my invention may be obtained through the use of substantially the same or equivalent means.

I claim:

1. In a draining device for facilitating draining of the crankcase, differential or like parts of an automotive vehicle, the combination comprising a funneling pan having an outlet formed therein, an intercepting pan assembly adapted to be extended in a substantially horizontal plane from said funneling pan for conveying draining lubricant thereto, a telescopically movable tube assembly communicating with said outlet for supporting said pans for movement as a unit about a vertical axis and for elevation into close proximity to the underside of said vehicle, and means for pivotally securing said intercepting pan assembly to said funneling pan for movement between a substantially horizontal draining position and a collapsed position in alignment with said tube assembly for storage.

2. In a draining device for facilitating draining of the crankcase, differential or like parts of an automotive vehicle, the combination comprising a funneling pan having an outlet formed therein, a longitudinally extensible intercepting pan assembly adapted to be extended in a substantially horizontal plane from said funneling pan for conveying draining lubricant thereto, means for pivotally securing said intercepting pan assembly to said funneling pan for movement between a substantially horizontal draining position and a substantially upright storage position, and a telescopically movable tube assembly receiving lubricant from said outlet for supporting said pans for movement as a unit about a vertical axis and for elevation into close proximity to the underside of said vehicle.

3. In a draining device for facilitating draining of the crankcase, differential or like parts of an automotive vehicle, the combination comprising a funneling pan having an outlet formed therein, an intercepting pan assembly adapted to be extended in a substantially horizontal plane from said funneling pan for conveying draining lubricant thereto, a telescopically movable tube assembly communicating with said outlet for supporting said pan assembly for movement as a unit about a vertical axis and for elevation into close proximity to the underside of said vehicle, means for pivotally securing said intercepting pan assembly to said funneling pan for movement between a substantially horizontal draining position and a collapsed position in alignment with said tube assembly for storage, and means for supporting said tube assembly to permit descent of the same to a position carrying said collapsed intercepting pan assembly below the ground or floor level for storage.

4. In a draining device adapted to be housed in a pit below the ground or floor level for facilitating draining of the crankcase, differential, or like parts of an automotive vehicle, the combination comprising a drain pan assembly including a longitudinally extensible and collapsible intercepting pan assembly pivotally movable between a substantially horizontal draining position and a substantially upright collapsed position, a tube assembly communicating with said drain pan assembly for receiving lubricant therefrom, said tube assembly including a base tube and one or more telescopically movable tubes for elevating said pan assembly into close proximity to the underside of said vehicle, and means carried by the walls of said pit and fixed to said base tube for supporting the same at a position in said pit to permit descent of the telescoping tubes and collapsed drain pan assembly to a position for storage below the ground or floor level.

5. A draining device as set forth in claim 4, in which the means carried by the walls of said pit comprises a hanger secured upon carriages longitudinally movable along opposite walls of the pit to adapt said draining device for movement longitudinally of a vehicle positioned over said pit.

6. In a draining device adapted to be housed in a pit below the ground or floor level for facilitating draining of the crankcase, differential, or like parts of an automotive vehicle, the combination comprising a drain pan assembly including a longitudinally extensible and collapsible intercepting pan assembly pivotally movable between a substantially horizontal draining position and a substantially upright position for storage, a tube assembly communicating with said drain pan assembly for receiving lubricant therefrom, said tube assembly including a base tube and one or more tubes telescopically movable for elevating said pan assembly from a stored position to a position in close proximity to the underside of said vehicle, means carried by the walls of said pit for supporting said tube assembly, and friction means carried by said tube assembly for releasably locking said telescoping tubes in extended position.

7. In a draining device for facilitating draining of the crankcase, differential, or like parts of an automotive vehicle, the combination comprising a drain pan assembly having an outlet formed therein and including intercepting and funneling parts for conveying draining lubricant to said outlet, a tube assembly for supporting said drain pan assembly and receiving lubricant from said outlet, said tube assembly including a base tube fixed against telescopic movement, an intermediate tube telescopically movable with respect to said base tube, an upper tube telescopically movable with respect to said intermediate tube, a first sleeve member for guiding telescopic movement of said intermediate tube, a second sleeve member for guiding telescopic movement of said upper tube, cooperating means on said first sleeve member and intermediate tube for releasably locking the latter in extended position, and friction means carried by said second sleeve member adapted to be engaged with said upper tube member for locking the latter at a desired position of extension including releasable means for facilitating telescopic movement of said upper tube.

8. In a draining device for facilitating draining of the crankcase, differential, or like parts of an automotive vehicle, the combination comprising a drain pan assembly having an outlet formed therein and including intercepting and funneling parts for conveying draining lubricant to said outlet, a tube assembly for supporting said drain pan assembly and receiving lubricant from said outlet, said tube assembly including a base tube and one or more tubes telescopically movable with respect thereto, outlet means for draining lubricant from said tube assembly, and means for closing the telescoping portion of said tube assembly below the upper end thereof including a check valve permitting flow of lubricant from the portion of said tube assembly above said valve to the portion therebelow, said valve closing automatically when the telescoping tubes are moved in a collapsing direction to cause lubricant in the tube assembly below said valve to be forced through said outlet means during collapsing movement of the telescoping tubes.

9. In a draining device for facilitating draining of the crankcase, differential, or like parts of an automotive vehicle, the combination comprising a funneling pan having vertically extending front, back and end walls, an intercepting pan assembly adapted to be extended in a substantially horizontal plane for conveying draining lubricant to said funneling pan, means for pivotally securing said intercepting pan assembly to the end walls of said funneling pan including a slot in each of said end walls and pivot means extending through said slots and fixed to said intercepting pan assembly, means for securing said intercepting pan assembly in an upright position for storage including fixed means on said end walls and a pair of slots in said intercepting pan assembly adapted to be brought into aligned relation with said fixed means and the slots in said end walls upon movement of said intercepting pan assembly to vertical position to permit the pivot means and intercepting pan assembly to drop sufficiently lockingly to engage the slots in said intercepting pan assembly upon said fixed means, and a tube assembly adapted to support said funneling and intercepting pan assemblies, said tube assembly receiving draining lubricant from said funneling pan.

10. In a draining device for facilitating draining of the crankcase, differential, or like parts of an automotive vehicle, the combination comprising a funneling pan having vertically extending front, back and end walls, an intercepting pan assembly including nestable trough shaped members, means forming a sliding connection between said members adapting the inner of said members for movement longitudinally with respect to the outer of the members, means for pivotally securing said intercepting pan assembly to the end walls of said funneling pan, means carried by said funneling pan for engaging the underside of said intercepting pan assembly to support the same in a substantially horizontal plane, means for securing said intercepting pan assembly in a substantially upright position for storage, and a tube assembly adapted to support said funneling and intercepting pan assemblies, said tube assembly receiving draining lubricant therefrom.

11. A device for draining crankcases or other parts of automotive vehicles comprising a receiving member having side walls and a bottom with an outlet opening, longitudinally extensible means to intercept draining lubricant, pivot means to secure said intercepting means to said receiving member for pivotal movement between a substantially upright inoperative position and a substantially horizontally extending operative position, said intercepting means having a bottom inclined to cause lubricant intercepted thereby to drain into said receiving member when the intercepting means is at operative position, a tube assembly supporting said receiving member and intercepting means and communicating with said outlet for draining lubricant from the receiving member, and fixed means engaged by a fixed part of said intercepting means when the latter is moved to operative position and co-operating with the pivotal connection to form a fulcrum for supporting the intercepting means at operative position.

12. A device for draining crankcases or other parts of automotive vehicles comprising a receiving member having an open upper end and a bottom with an outlet opening, longitudinally extensible means to intercept draining lubricant, means for securing said intercepting means to said receiving member including pivot means fixed to one of said parts and vertically extending journal slots in the other in which said pivot means is rotatable and vertically slidable, means to guide movement of said intercepting means between operative and inoperative positions and for locking the intercepting means in inoperative position including fixed abutments on the receiving member and open slots in said intercepting means, said fixed abutments, open slots and journal slots being brought into vertical alignment when said intercepting means is brought to vertical position to free the latter for vertical movement in a direction to bring said open slots into locking engagement with said fixed abutments, a tube assembly supporting said receiving member and intercepting means and communicating with said outlet for draining lubricant from the receiving member, and fixed means engaged by a fixed part of said intercepting means when the latter is moved to operative position and co-operating with the pivotal connection to form a fulcrum for supporting the intercepting means at operative position.

13. A device for draining crankcases or other parts of automotive vehicles comprising a generally rectangular receiving member having a bottom wall with an outlet formed therein, means to intercept draining lubricant including longitudinally extensible and collapsible generally rectangular trough shaped members, means forming a pivot connection securing said intercepting means to said receiving member for pivotal movement between a generally horizontal lubricant intercepting operative position and a generally vertical inoperative position, said intercepting means having a bottom inclined to cause lubricant to drain into said receiving member when said intercepting means is in operative position, means fixedly to support said intercepting means at either of the positions to which it is movable, and a tube assembly to support said receiving member and intercepting means communicating with said outlet to receive lubricant therefrom.

14. A device for draining crankcases or other parts of automotive vehicles comprising receiving means for intercepting draining lubricant having a bottom wall with an outlet in a portion thereof, other portions of said receiving means being conformed to cause lubricant to drain toward said outlet, a tube assembly to support said receiving means and receive lubricant from said outlet including a tube fixed against axial movement and at least two tubes telescopically movable relative to said first tube and each other, and adjustable means effective between said telescopically engaged tubes frictionally to restrain movement thereof and hold said tubes at extended positions relative to each other and the fixed tube including means frictionally to restrain the tube on the end of said tube assembly opposite said fixed tube sufficiently to prevent telescopic movement thereof relative to the tube with which it is engaged until said other tubes have moved to the limit of their telescopic movement.

15. A device as set forth in claim 14 wherein the last mentioned restraining means includes frictional restraining means releasable manually to facilitate telescopic movement of said end tube, said restraining means affording sufficient restraint when in operative position to lock said end tube and the receiving means against movement at any position of extension of said end tube.

CHARLES F. RAISCH.

REFERENCES CITED

The following references are of record in the file of this patent:

UNITED STATES PATENTS

| Number | Name | Date |
| --- | --- | --- |
| 1,582,758 | Jones | Apr. 27, 1926 |
| 1,606,342 | Bruce | Nov. 9, 1926 |
| 1,949,394 | Martin | Feb. 27, 1934 |
| 1,949,777 | Bristol | Mar. 6, 1934 |
| 2,021,585 | Zarovy | Nov. 19, 1935 |
| 2,267,552 | Currier | Dec. 23, 1941 |

FOREIGN PATENTS

| Number | Country | Date |
| --- | --- | --- |
| 662,953 | Germany | Nov. 1, 1938 |